United States Patent [19]
Wada et al.

[11] Patent Number: 5,762,990
[45] Date of Patent: Jun. 9, 1998

[54] FAT COMPOSITION FOR NUT FILLING AND NUT FILLING

[75] Inventors: Eiko Wada, Kishiwada; Tugio Nishimoto, Naga-gun; Tugio Izumi, Sennan-gun, all of Japan

[73] Assignee: Fuji Oil Co., Ltd., Japan

[21] Appl. No.: 687,475

[22] PCT Filed: Dec. 7, 1995

[86] PCT No.: PCT/JP95/02501

§ 371 Date: Aug. 5, 1996

§ 102(e) Date: Aug. 5, 1996

[87] PCT Pub. No.: WO96/17528

PCT Pub. Date: Jun. 13, 1996

[30] Foreign Application Priority Data

Dec. 7, 1994 [JP] Japan .................. 6-304062

[51] Int. Cl.$^6$ .................. A23D 9/06; A23L 1/38
[52] U.S. Cl. .................. 426/633; 426/607; 426/608
[58] Field of Search .................. 426/607, 608, 426/632, 633

[56] References Cited

U.S. PATENT DOCUMENTS

| | | | |
|---|---|---|---|
| 3,671,267 | 6/1972 | Gooding | 426/633 |
| 3,903,311 | 9/1975 | Billerbeck | 426/633 |
| 4,000,322 | 12/1976 | Billerbeck | 426/633 |
| 4,219,584 | 8/1980 | Mori | 426/607 |
| 4,268,527 | 5/1981 | Matsuo | 426/607 |
| 4,276,322 | 6/1981 | Padley | 426/607 |
| 4,283,436 | 8/1981 | Soeters | 426/607 |
| 4,847,105 | 7/1989 | Yokobori | 426/611 |
| 4,873,109 | 10/1989 | Tanaka | 426/607 |
| 4,877,636 | 10/1989 | Koyano | 426/607 |
| 4,910,037 | 3/1990 | Sagi | 426/607 |
| 5,079,027 | 1/1992 | Wong | 426/633 |
| 5,135,769 | 8/1992 | Itagaki | 426/607 |
| 5,403,601 | 4/1995 | Komai | 426/633 |

FOREIGN PATENT DOCUMENTS

| | | | |
|---|---|---|---|
| 4-53447 | 2/1992 | Japan | 426/607 |
| 4-248954 | 9/1992 | Japan . | |
| 5-276866 | 10/1993 | Japan . | |
| 5-276903 | 10/1993 | Japan . | |
| 6-7087 | 1/1994 | Japan . | |
| 7-264981 | 10/1995 | Japan . | |
| 2142340 | 1/1985 | United Kingdom | 426/607 |

OTHER PUBLICATIONS

Giddey 1961 Polymorphism in Cocoa Butter Rev. Int. Choc 10 pp. 548–554.

*Primary Examiner*—Carolyn Paden
*Attorney, Agent, or Firm*—Wenderoth, Lind & Ponack

[57] ABSTRACT

The present invention is directed to a fat composition for nut filling characterized in that it contains an emulsifier(s) at the total amount of 1.0–10.0 wt. % in a fat comprising 35–60 wt. % of 1,3-distearo-2-olein (StOSt) and having a solid fat content of 70–85%/20 C., 50–75%/30° C., 5–50%/35° C. and 3% or less/40° C., and a nut filling comprising 5–25 wt. % of the same. The use of the fat composition for nut filling of the present invention makes it possible to obtain a nut filling having high resistance to fat migration, giving a good sense of eating and exhibiting good melting properties in the mouth, although it contains a large amount of nut paste rich in low-melting fats.

4 Claims, No Drawings

FAT COMPOSITION FOR NUT FILLING AND NUT FILLING

This application is the National Stage of International Application No. PCT/JP95/02501, filed Dec. 7, 1995.

DESCRIPTION

1. Technical Filed

The present invention relates to a fat composition for nut filling and a nut filling.

2. Background Art

As the materials for the center cream of chocolate and for the sandwiched cream between the pieces of baked confectionery such as biscuits and cookies, there has hitherto been widely used nut fillings containing nut paste as a flavoring material, which may be optionally blended with fat, sugar and powdered milk. When a nut filling containing nut paste with a high oil content blended at large amounts is used, however, low-melting fat ingredients contained in the paste will migrate in the chocolate layer or in the baked cereal layer, thereby causing the quality deterioration of products, such as deformation, change in quality and change in the sense of eating. For example, in the case of shell chocolates consisting of chocolate and center cream, the depression of shells or the occurrence of whitening (blooming) will be caused by fat migration. Furthermore, the center cream will come to have a crumbly texture, which leads to quality deterioration in appearance and in the sense of eating, resulting in the loss of goods value.

As the measures to be taken for this problem, there have been disclosed, for example, a method in which high-melting fractions of hydrogenated palm oil are added (JP-A 5-276866), which corresponds to U.S. Pat. No. 5,403,601 and a method in which silicon dioxide is added (JP-A 5-244869). Even if these methods are used, however, the melting properties in the mouth are deteriorated, and incongruity on the sense of eating is liable to occur. In other words, the better the resistance to fat migration is given, the more the melting properties in the mouth are damaged; it has, therefore, been difficult to comply with both the requirements at the same time.

3. Disclosure of the Invention (Problems to be Solved by the Invention)

The purpose is to provide a nut filling in which fat migration can be inhibited, even if nut paste with a high oil content is blended at large amounts, and which exhibits good melting properties in the mouth, and for attaining this purpose, a fat composition to be blended in such a nut filling.

(Means of Solving the Problems)

(1) Summary

The present inventors have intensively studied the problem, resulting in a finding that a fat composition prepared by the addition of an emulsifier(s) to a particular fat containing 1,3-distearo-2-olein (hereinafter referred to as StOSt) at the controlled amount or more can exhibit the inhibition of fat migration without causing no deterioration of the melting properties in the mouth, thereby completing the present invention. That is, the present invention is directed to a fat composition for nut filling characterized in that it contains an emulsifier(s) at the total amount of 1.0–10.0 wt. % in a fat comprising 35–60 wt. % of StOSt and having a solid fat content of 70–85%/20° C., 50–75%/30° C., 5–50%/35° C. and 3% or less/40° C., and a nut filling comprising such a fat composition for nut filling. Various elements to make up the present invention will be explained in the following separated items.

(2) Fat

The fat in the present invention is prepared using, alone or in combination, neat conventional fats, which have hitherto been used as the raw material fats of hard butter, e.g., vegetable fats such as palm oil, shea butter, sal fat, illipe butter and mango butter, or those obtained by subjecting such conventional fats to processing treatment such as fractionation or transesterification, so that the fat contains 35–60 wt. % of StOSt and has a solid fat content of 70–85% at 20° C., 50–75% at 30° C., 5–50% at 35° C. and 3% or less at 40° C. The solid fat content was measured by the NMR pulse method after cooling the fat from 80° C. down to 0° C. and keeping it at 0° C. for 1.5 hours, at 26° C. for 40 hours, at 0° C. for 1.5 hours, and at each temperature as above for 1 hour.

When the proportion of StOSt is less than 35 wt. %, satisfactory resistance to fat migration cannot be attained. On the other hand, when the proportion of StOSt exceeds 60 wt. %, the melting properties in the mouth are deteriorated, so that incongruity in the sense of eating becomes apparent.

When the solid fat content is less than 70% at 20° C. and less than 50% at 30° C., satisfactory resistance to fat migration cannot be attained. In contrast, when the solid fat content exceeds 75% at 30° C., exceeds 50% at 35° C. and exceeds 3% at 40° C., the melting properties in the mouth are deteriorated, so that incongruity in the sense of eating becomes apparent.

To comply with such a solid fat content, the total amount of 1-palmito-2-oleo-3-stearin (hereinafter referred to as POSt) and 1,3-stearo-2-olein (hereinafter referred to as StOSt) is preferably adjusted to 45–75 wt. % because the melting properties in the mouth become much better.

(3) Emulsifier

The emulsifier added to the above fat is preferably selected from sugar esters, glycerin-monofatty acid esters or polyglycerin-fatty acid esters with more preferred being those containing a saturated fatty acid group of 16–22 carbon atoms. Among these emulsifiers, an emulsifier, or a combination of two or more emulsifiers, is added to the above fat at the total amount of 1.0–10.0 wt. %. When the addition amount is less than 1.0 wt. %, fat migration resistance is not clear. When the addition amount exceeds 10.0 wt. %, the melting properties in the mouth are deteriorated, so that incongruity in the sense of eating becomes apparent.

The preferred range of addition amount may vary with the kind of emulsifier: 3.0–10.0 wt. % for sugar esters; 1.0–5.0 wt. % for glycerin-monofatty acid esters; and 3.0–7.0 wt. % for polyglycerin-fatty acid esters.

(4) Nut paste and Nut filling

The nut paste as a preferred example for applying the fat composition of the present invention is prepared by roasting high oil content nuts, such as peanuts, almonds, cashew nuts, hazelnuts, pistachio nuts, macadamia nuts, pecan nuts and walnuts, and then grinding the roasted nuts into a paste form with a known means of grinding, such as a triple roll mill. The nut paste thus obtained has an oil content of about 40–75 wt. %. The fat composition for nut filling of the present invention can be blended with a nut filling consisting of such nut paste, sugar, powdered milk and the like to give fat migration resistance. The blending amount may vary with the blending amount of nut paste and the like; when 20 wt. % or more of nut paste is blended, the fat composition for nut filling of the present invention may be blended at the proportion of 5–25 wt. %, preferably 10–20 wt. %.

The nut filling thus obtained exhibits good melting properties in the mouth and seldom causes troubles such as shell depression or whitening by fat migration, even if used as the center cream or sandwiched cream.

EXAMPLES AND COMPARATIVE EXAMPLES

In the following Examples and Comparative Examples, % and parts are by weight.

Fats having triglyceride compositions shown in Table 1 were prepared by mixing shea butter, enzymatically transesterified oil from high oleic sunflower oil and stearic acid, middle-melting fractions obtained by fractionation of enzymatically transesterified oil from palm middle-melting fractions and stearic acid by a known method, middle-melting fractions obtained in the same manner by fractionation of palm oil, and cacao butter at various ratios.

These fats were then stabilized at 0° C. for 1.5 hours, at 26° C. for 40 hours and at 0° C. for 1 hour, followed by keeping them at each temperature of 20° C., 30° C., 35° C. and 40° C., and the solid fat contents were measured by the NMR pulse method. The measurement results are also shown in Table 1.

TABLE 1

| | Triglyceride composition (%) | | Solid fat content (%) | | | |
|---|---|---|---|---|---|---|
| | POSt + StOSt | StOSt | 20° C. | 30° C. | 35° C. | 40° C. |
| Fat 1 | 72 | 54 | 79.7 | 66.0 | 36.3 | 2.4 |
| Fat 2 | 68 | 44 | 77.2 | 64.7 | 24.0 | 1.3 |
| Fat 3 | 66 | 36 | 75.3 | 55.3 | 6.7 | 0.7 |
| Fat 4 | 74 | 63 | 81.8 | 72.4 | 45.5 | 3.1 |
| Fat 5 | 63 | 26 | 74.4 | 44.6 | 0.7 | 0.4 |

[Examples 1–5]

Emulsifiers were added to fats 1–3 shown in Table 1, which were designated Examples 1–5 (Table 2). Palmitic acid sugar ester ("P-170", manufactured by Mitsubishi Kasei Shokuhin Kabushiki Kaisha) was used in Example 1–3; glycerin-monobehenic acid ester ("B-100", manufactured by Riken Vitamin Kabushiki Kaisha), in Example 4; and polyglycerin behenic acid ester ("DGMB", manufactured by Riken Vitamin Kabushiki Kaisha), in Example 5.

[Comparative Examples 1–6]

Emulsifiers were added to, or not added to, fats 4, 5 and 2 shown in Table 1, which were designated Comparative Examples 1–6 (Table 2).

TABLE 2

| | Base fat | Proportion of emulsifier (%) | |
|---|---|---|---|
| Example 1 | fat 1 | P-170 | 3.5 |
| Example 3 | fat 3 | P-170 | 3.5 |
| Example 4 | fat 2 | B-100 | 3.5 |
| Example 5 | fat 2 | DGMB | 3.5 |

TABLE 2-continued

| | Base fat | Proportion of emulsifier (%) | |
|---|---|---|---|
| Comp. Ex. 1 | fat 4 | — | |
| Comp. Ex. 2 | fat 5 | — | |
| Comp. Ex. 3 | fat 2 | — | |
| Comp. Ex. 4 | fat 5 | P-170 | 3.5 |
| Comp. Ex. 5 | fat 5 | B-100 | 3.5 |
| Comp. Ex. 6 | fat 5 | DGMB | 3.5 |

[Nut filling]

Nut fillings containing 30% or more of nut paste were prepared using the fat compositions for nut filling of Examples 1–5 and Comparative Examples 1–6 shown in Table 1. More specifically, 16.2 parts of each fat for nut filling, 33.4 parts of hazelnut paste (oil content, about 65%), 39.0 parts of sugar, 5.6 parts of whole milk powder, 5.8 parts of cocoa powder and 0.4 part of lecithin were mixed and subjected to rolling, followed by conching treatment at 60° C. for 2–3 hours, which afforded a nut filling.

The measurement results for the hardness of each nut filling are shown in Table 4. These values were obtained by measurement with a rheometer after pouring each nut filling into a mold to form a solid nut filling, which was left at 20° C. for 1 week and then let stand at each temperature for 2 hours.

[Shell chocolate]

"Shell chocolates" were prepared using each nut filling as the center cream. More specifically, a chocolate obtained by blending as shown in Table 3 was subjected to tempering in an ordinary manner and then formed in the shape of a shell, into which center portion each nut filling was poured after tempering in the same manner, followed by cooling for solidification. The weight ratio of chocolate to center cream was adjusted to 2:1.

TABLE 3

| | Chocolate blend (parts) |
|---|---|
| Cacao mass | 35.0 |
| Powdered sugar | 53.0 |
| Cocoa butter | 12.0 |
| Lecithin | 0.5 |

These shell chocolates were stored in the temperature zone of 25° C., and the occurrence of blooming was observed. The results are shown in Table 4, together with the results obtained by evaluation of the sense of eating and the melting properties in the mouth for the shell chocolates.

TABLE 4

| | Storage test (number of days) | | | | Hardness Rheometer value (g) | | Sense of eating & melting properties | Overall |
|---|---|---|---|---|---|---|---|---|
| | 7 days | 14 days | 21 days | Judgement | 20° C. | 25° C. | | |
| Example 1 | − | − | − | ○ | 965 | 450 | ○ | ○ |
| Example 2 | − | − | + | ○ | 782 | 320 | ○ | ○ |
| Example 3 | − | + | + | ○ | 698 | 204 | ○ | ○ |
| Example 4 | − | − | + | ○ | 863 | 351 | ○ | ○ |
| Example 5 | − | − | + | ○ | 988 | 420 | ○ | ○ |
| Comp. Ex. 1 | − | + | ++ | Δ | 1090 | 490 | X | X |
| Comp. Ex. 2 | ++ | +++ | +++ | X | 532 | 132 | ○ | X |

TABLE 4-continued

|  | Storage test (number of days) | | | | Hardness Rheometer value (g) | | Sense of eating & melting properties | Overall |
| --- | --- | --- | --- | --- | --- | --- | --- | --- |
|  | 7 days | 14 days | 21 days | Judgement | 20° C. | 25° C. | | |
| Comp. Ex. 3 | + | + | ++ | Δ | 840 | 320 | ○ | Δ |
| Comp. Ex. 4 | + | ++ | +++ | X | 482 | 78 | ○ | X |
| Comp. Ex. 5 | + | ++ | +++ | X | 364 | 101 | ○ | X |
| Comp. Ex. 6 | ++ | +++ | +++ | X | 599 | 130 | ○ | X |

(Criteria)
−; no blooming
+; slight blooming
++; full blooming
+++; remarkable blooming
○; good
Δ; moderate
X; poor As can be seen from the results in Table 4, the nut fillings containing the fat compositions in Examples 1–5 of the present invention gave a good sense of eating, exhibited good melting properties in the mouth and had high blooming resistance. The nut filling in Comparative Example 1 gave a poor sense of eating and exhibited poor melting properties in the mouth because the filling was too hard. The nut filling in Comparative Example 2 gave a good sense of eating and exhibited good melting properties in the mouth, but it had extremely deteriorated blooming resistance and exhibited poor storage properties. The nut filling in Comparative Example 3 had no problems on the sense of eating and on the melting properties in the mouth, but it had insufficient blooming resistance.

In Comparative Examples 4–6, the results showing the deterioration of blooming resistance were also obtained. It is, therefore, found that the advantages of the present invention cannot be exhibited by the simple addition of an emulsifier.

[Advantages]

The use of the fat composition for nut filling of the present invention makes it possible to obtain a nut filling having high resistance to fat migration, giving a good sense of eating and exhibiting good melting properties in the mouth, although it contains a large amount of nut paste rich in low-melting fats. This further makes it possible to provide high-quality products causing only small deformation, change in quality and change in the sense of eating during circulation.

We claim:

1. A nut filling comprising:
   a. 5–25 wt % of a fat composition, said fat containing 35–60 wt % 1,3-distearo-2-olein, said fat having a solid fat content of 70–85% at 20° C., 50–75% at 30° C., 5–50% at 35° C. and 3% or less at 40° C.,
   b. 1.0–10.0% emulsifier and
   c. 20 wt % or more of a nut paste with at least 40 wt % fat.

2. A nut filling comprising:
   a. 5–25 wt % of a fat composition, said fat containing 35–60 wt % of 1,3-distearo-2-olein and 45–75 wt % of the total amount of 1,3-distearo-2-olein and 1-palmito-2-oleo-3-stearin, said fat having a solid fat content of 70–85% at 20° C., 50–75% at 30° C., 5–50% at 35° C. and 3% or less at 40° C.,
   b. 1.0–10.0% emulsifier and
   c. 20 wt % or more of a nut paste with at least 40 wt % fat.

3. A nut filling comprising:
   a. 5–25 wt % of a fat composition, said fat containing 35–60 wt % of 1,3-distearo-2-olein, said fat having a solid fat content of 70–85% at 20° C., 50–75% at 30° C., 5–50% at 35° C. and 3% or less at 40° C.,
   b. 1.0–10.0% emulsifier, said emulsifier being two or more emulsifiers selected from the group consisting of sugar esters, glycerin-monofatty acid esters and polyglycerin fatty acid esters and
   c. 20 wt % or more of a nut paste with at least 40 wt % fat.

4. A nut filling comprising:
   a. 5–25 wt % of a fat composition, said fat comprising 35–60 wt % of 1,3-distearo-2-olein and 45–75% of the total amount of 1,3-distearo-2-olein and 1-palmito-2-stearin, said fat having a solid fat content of 70–85% at 20° C., 50–75% at 30° C., 5–50% at 35° C. and 3% or less at 40° C.,
   b. 1.0–10.0% emulsifier, said emulsifier being two or more emulsifiers selected from the group consisting of sugar esters, glycerin-monofatty acid esters and polyglycerin fatty acid esters and
   c. 20 wt % or more of a nut paste with at least 40 wt % fat.

* * * * *